Dec. 11, 1934.  G. LÜDECKE  1,983,623
METHOD OF MAKING A DRY CELL BOBBIN
Filed May 19, 1931
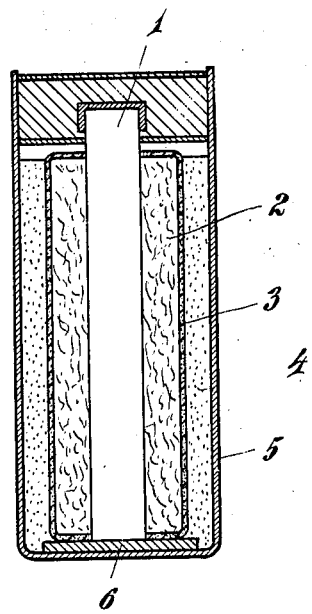
Georg Lüdecke
INVENTOR Patented Dec. 11, 1934

1,983,623

UNITED STATES PATENT OFFICE 1,983,623

METHOD OF MAKING A DRY CELL BOBBIN

Georg Lüdecke, Munich, Germany

Application May 19, 1931, Serial No. 538,470
In Germany March 26, 1930

1 Claim. (Cl. 136—124)

In order to protect the positive electrode of electric elements against disintegration during the immersion thereof in the electrolyte, gauze or thread is wrapped round the positive electrodes. As such wrapping considerably increases the cost of such positive electrodes, it has been proposed to supply the electrodes with a coating, which is made by immersing them in readily hardening or setting liquids or by coating or spraying them with such liquids. Among the liquids used for this purpose are collodion, liquid wax and paraffin, ceresite, albumens, and colloidal substances such as silicates. In practice, such coatings have found but little favour heretofore, as they are not sufficiently porous, inasmuch as they do not allow the electrolyte to penetrate at all or but with difficulty. The consequence is that the tensions and the capacities of elements made of such positive electrodes are so low, that they do not meet present day requirements.

The present invention relates to an electrode coating which is not only more economical in cost of manufacture than gauze or thread wrappers, but which moreover does not adversely affect the tension, capacity, and capability of storing an electric element in any way.

The coating according to the invention consists of acetylized cellulose. Specially advantageous is the use of incompletely acetylized cellulose, for instance such, where the process of acetylization was not allowed to continue to the end. The coating desirably also contains additional substances for increasing its porosity, for instance pure cellulose. Also such additional substances may be used as can be eliminated again after hardening of the coating without destroying the latter.

To make a coating, acetyl cellulose is dissolved. Additional substances, such as alkaline salts for instance, are admixed therewith. The coating is made by evaporation or precipitation. The additional substances are eliminated by water.

In the accompanying drawing an electric element is represented with an electrode according to the present invention in longitudinal section.

The dry cell consists of a carbon rod (1), a jacket (2) surrounding it, a coating (3) of the jacket, the electrolyte (4), and the cup (5). The jacket is composed of an intimate mixture of finely pulverized graphite and brownstone. The electrolyte consists of a solution of ammonium chloride. At the bottom inside the cup there is an insulating strip (6).

In order to prevent the jacket (2) from crumbling off, the latter is provided with a coating (3). This coating consists of acetyl cellulose or incompletely acetylized cellulose or of acetyl cellulose with additional substances. The manufacture of the coating may be carried out according to the following examples:

Example I

Completely acetylized cellulose is dissolved in suitable solvents, for instance chloroform. The brownstone-graphite electrode is immersed into the solution. After the solution sets on the electrode the latter has a coating meeting all demands made on such coatings in every respect.

Example II

Cellulose is incompletely acetylized in the known manner. The resulting mass is dissolved in a mixture of chloroform and alcohol. As above, the coating is made of the solution, the outstanding feature of which is its permeability to liquids.

Example III

Acetyl cellulose is dissolved in acetylene tetrachloride. Finely divided pure cellulose is admixed to the solution and a suspension is produced by stirring. The electrode is immersed in this suspension. The pure cellulose contained in the coating of the electrode is permeable for liquids, so that also in this case the electrolyte can pass freely through the coating.

Example IV

Ordinary commercial acetyl cellulose suitable for the manufacture of lacquers is dissolved in acetone. Diazene acetone alcohol is added. In this solution finely pulverized calcium chloride is stirred. In this suspension the brownstone-graphite electrode is immersed. Through subsequent immersion into water the acetyl cellulose is percipitated and the calcium chloride is eliminated.

The calcium chloride eliminated leaves in the coating a plurality of pores which admit a free passage of the electrolyte through the coating without difficulty.

Example V

In order to increase the permeability for liquids, the coatings made according to Examples I–IV may also be provided with perforations in a mechanical way, which are conveniently made with a pin.

Thorough experiments have shown that electric elements, the electrodes of which are provided with a coating according to the present invention, possess the same high tension, capacity and capability of storing as elements, the electrodes of which are wrapped in gauze. The manufacture of the coatings may be done in series without difficulty, which entails a considerable saving as compared with the electrodes surrounded by gauze wrappers. The coatings themselves protect the jacket perfectly against disintegration, as experiments have also shown.

What I claim is:

The method of producing a dry cell bobbin, which comprises dissolving acetyl cellulose in a mixture of chloroform and alcohol, and immersing the bobbin in the solution to form a porous coating on the bobbin.

GEORG LÜDECKE.